US008723929B2

(12) United States Patent
Chen et al.

(10) Patent No.: US 8,723,929 B2
(45) Date of Patent: May 13, 2014

(54) MINIATURIZED IMAGING MODULE, 3D DISPLAY SYSTEM USING THE SAME AND IMAGE ARRANGEMENT METHOD THEREOF

(75) Inventors: Wu-Li Chen, Changhua (TW); Chao-Hsu Tsai, Hsinchu (TW); Shu-Chuan Cheng, Taichung (TW); Chang-Shuo Wu, Xinzhuang (TW)

(73) Assignee: Industrial Technology Research Institute, Hsinchu (TW)

( * ) Notice: Subject to any disclaimer, the term of this patent is extended or adjusted under 35 U.S.C. 154(b) by 740 days.

(21) Appl. No.: 12/841,741

(22) Filed: Jul. 22, 2010

(65) Prior Publication Data

US 2011/0157323 A1 Jun. 30, 2011

(30) Foreign Application Priority Data

Dec. 29, 2009 (CN) .......................... 2009 1 0266558

(51) Int. Cl.
*H04N 13/00* (2006.01)
(52) U.S. Cl.
USPC ............... 348/51; 348/E13.075; 348/E09.025
(58) Field of Classification Search
CPC .......... H04N 13/0409; H04N 13/0411; H04N 1/0404; H04N 1/0459
USPC ......................................................... 348/51
See application file for complete search history.

(56) References Cited

U.S. PATENT DOCUMENTS

| | | | |
|---|---|---|---|
| 5,614,941 A * | 3/1997 | Hines .............................. | 348/42 |
| 6,578,971 B1 * | 6/2003 | Neff .............................. | 353/121 |
| 6,623,120 B2 * | 9/2003 | Neff et al. ......................... | 353/7 |
| 6,736,512 B2 * | 5/2004 | Balogh ............................ | 353/7 |
| 6,877,857 B2 * | 4/2005 | Perlin .............................. | 353/7 |
| 6,999,071 B2 * | 2/2006 | Balogh ........................... | 345/419 |
| 7,084,841 B2 * | 8/2006 | Balogh ............................ | 345/87 |
| 7,959,294 B2 * | 6/2011 | Balogh .............................. | 353/7 |
| 2003/0107712 A1 * | 6/2003 | Perlin .............................. | 353/31 |
| 2003/0151722 A1 * | 8/2003 | Neff et al. ......................... | 353/7 |
| 2008/0304014 A1 * | 12/2008 | De Vaan ........................... | 353/10 |
| 2009/0112892 A1 * | 4/2009 | Cardie et al. ................... | 707/100 |
| 2009/0190096 A1 | 7/2009 | Chen et al. | |
| 2009/0225418 A1 * | 9/2009 | Katsura et al. ................ | 359/457 |
| 2010/0253916 A1 * | 10/2010 | Gao et al. .......................... | 353/7 |
| 2011/0019270 A1 * | 1/2011 | Kitano et al. .................. | 359/361 |
| 2011/0063575 A1 * | 3/2011 | Nelson et al. ..................... | 353/7 |
| 2012/0013651 A1 * | 1/2012 | Trayner et al. ................ | 345/690 |
| 2012/0127320 A1 * | 5/2012 | Balogh .......................... | 348/180 |

* cited by examiner

*Primary Examiner* — Christopher S Kelley
*Assistant Examiner* — Deirdre Beasley
(74) *Attorney, Agent, or Firm* — McClure, Qualey & Rodack, LLP

(57) ABSTRACT

A miniaturized imaging module, a 3D display system using the same and an image arrangement method are disclosed. The 3D display system includes a plurality of multi-viewing zone miniaturized imaging modules and an image output module. The image output module is for editing, adjusting and distributing a multi-viewing zone image to the multi-viewing zone miniaturized imaging modules for display. Each multi-viewing zone miniaturized imaging module includes a housing, a projection unit and a viewing zone modulating screen. The projection unit and the viewing zone modulating screen are respectively disposed on two opposite sides inside the housing. In each multi-viewing zone miniaturized imaging module, the projection unit projects an image onto respective viewing zone modulating screen, and forms a plurality of viewing zones in front of the viewing zone modulating screen, wherein the image is a segmented image of an image composed of a plurality of images having different view-angles.

25 Claims, 14 Drawing Sheets

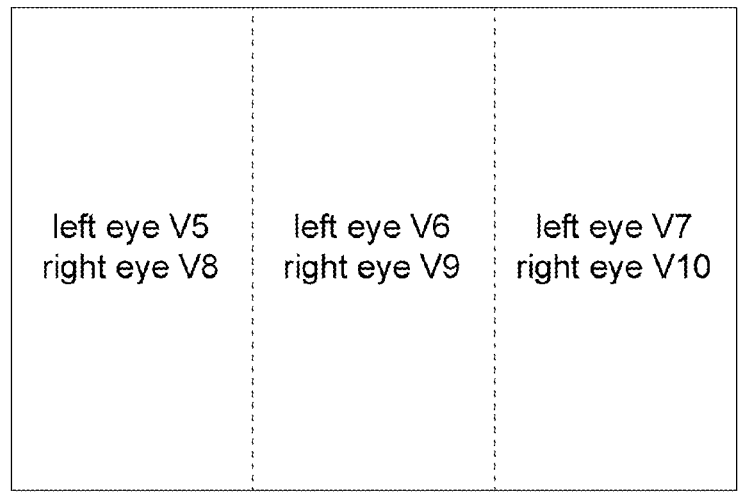
FIG. 16
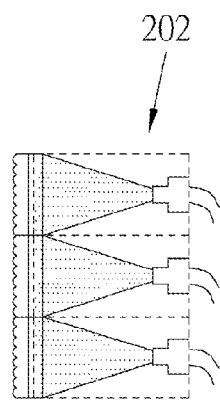 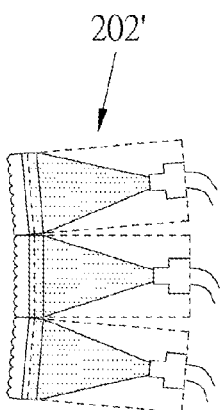 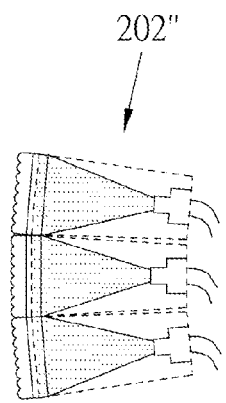
FIG. 17A    FIG. 17B    FIG. 17C

MINIATURIZED IMAGING MODULE, 3D DISPLAY SYSTEM USING THE SAME AND IMAGE ARRANGEMENT METHOD THEREOF This application claims the benefit of People's Republic of China application Serial No. 200910266558.3, filed Dec. 29, 2009, the subject matter of which is incorporated herein by reference.

BACKGROUND OF THE DISCLOSURE

1. Field of the Disclosure

The disclosure relates in general to a miniaturized imaging module and a 3D display system, and more particularly to a multi-viewing zone miniaturized imaging module capable of improving 3D image quality, a multi-viewing zone 3D display system using the same and an image arrangement method thereof.

2. Description of the Related Art

The 3D image display which comes after the flat display is getting more and more popular. Currently, the resolution level of the flat display is still relatively low. In the development of the spatial multiplex 3D display system, the resolution distributed to each viewing zone is small, so the image quality of the 3D display system is thus restricted. Of the current methods for providing a high-resolution spatial multiplex 3D display system, a practical method is to increase the resolution of the 3D display system by way of projection. Currently, there are many different projection methods of the 3D display system. For example, a structure of 3D display system as indicated in FIG. 1 is disclosed in United States Patent Number US 2009/0190096.

In FIG. 1, the 3D display system (that is, a miniaturized imaging module array 130) includes a plurality of miniaturized imaging modules 131~134 and a viewing zone modulating screen 110. Each miniaturized imaging module projects a segmented image of the image composed of a plurality of images having different view-angles. As indicated in FIG. 1, the miniaturized imaging modules 131~134 respectively project corresponding segmented images 121~124 onto four regions of the viewing zone modulating screen 110, wherein each segmented image is composed of a plurality of images having different view-angles, and the four segmented images 121~124 can construct a complete image 120. On the part of the viewing zone modulating screen 110, the viewing zone modulating screen 110 has a plurality of image regions for correspondingly receiving the segmented images 121~124 to form a plurality of images having different view-angles, wherein every two images having different view-angles construct a 3D display image.

According to the above projection method, the segmented images 121~124 projected on the four regions of the viewing zone modulating screen 110 are overlapped. As indicated in FIG. 1, the segmented image 121 overlaps neighboring segmented images 122~124 at different positions. When the 3D display system is moved, special image processing such as the adjustment and calibration of display brightness and image color need to be performed on the overlapped regions of neighboring images needs. In addition to being subjected to a higher precision in the alignment of position, if the seam of the image overlapped regions cannot be eliminated, 3D image may be easily segmented at the boundary seam, and the stereoscopic sense and representation of depth of the 3D image may easily be damaged. In response to the occurrence of image overlapped regions, brightness adjustment and color calibration are required, and the higher precision is required in the alignment of positions.

Moreover, the entire miniaturized imaging module array 130 being a single system is large in size, and system adjustment becomes more complicated and more difficult. When the terms of application change (for example, the entire system needs to display an even larger screen or perform an irregular splicing), the miniaturized imaging module array 130 must be accompanied with image processing, making the system more complicated. The impact of optical distortion caused by the miniaturized imaging module due to the optical tolerance in projection cannot be eliminated, largely increasing crosstalk during projection.

SUMMARY OF THE DISCLOSURE

The disclosure is directed to a multi-viewing zone miniaturized imaging module capable of improving 3D image quality, a multi-viewing zone 3D display system using the same and an image arrangement method thereof. Each of the miniaturized imaging modules is an independent projection unit, and the rims of the display regions of the miniaturized imaging modules are eliminated through the design of a special mechanism, so that the deterioration in the stereoscopic sense caused by the frame effect generated during the formation of a large-sized 3D display system is reduced.

According to a first aspect of the present disclosure, a 3D display system is provided. The 3D display system includes a plurality of multi-viewing zone miniaturized imaging modules and an image output module. The image output module is for editing, adjusting and distributing a multi-viewing zone image to the multi-viewing zone miniaturized imaging modules for display. Each multi-viewing zone miniaturized imaging module includes a housing, a projection unit and a viewing zone modulating screen. The projection unit and the viewing zone modulating screen are respectively disposed on two opposite sides inside the housing. In each multi-viewing zone miniaturized imaging module, the projection unit projects an image onto respective viewing zone modulating screen, and forms a plurality of viewing zones in front of the viewing zone modulating screen, wherein the image is a segmented image of an image composed of a plurality of images having different view-angles. All the viewing zone modulating screens of the multi-viewing zone miniaturized imaging module constitute a display screen.

According to a second aspect of the present disclosure, a miniaturized imaging module is provided. The miniaturized imaging module includes a housing, a projection unit and a viewing zone modulating screen. The projection unit and the viewing zone modulating screen are respectively disposed on two opposite sides inside the housing, and a correspondence relationship between the projection unit and the viewing zone modulating screen can be modulated. Wherein, the projection unit projects a to-be-displayed multi-viewing zone image onto the viewing zone modulating screen, the viewing zone modulating screen distributes the projection multi-viewing zone image to different regions in the space, and two images belonging to different spaces constitute a 3D display image.

According to a third aspect of the present disclosure, an image arrangement method of reducing the crosstalk of a 3D image is provided. The method includes the following steps:

providing a miniaturized imaging module having a viewing zone modulating screen;

providing a test pattern for defining the relationship between the actual positions of a plurality of sub-pixels generated from the projection by a projection unit and the ideal positions of a plurality of sub-pixels; and defining a pixel by re-arranging and re-grouping the actual positions of the sub-pixels closest to the ideal positions of the sub-pixels based on the relationship, obtained from the test pattern, between the actual positions and the ideal positions of the sub-pixels.

The disclosure will become apparent from the following detailed description of the preferred but non-limiting embodiments. The following description is made with reference to the accompanying drawings.

BRIEF DESCRIPTION OF THE DRAWINGS

FIG. 16 shows the viewing zones on different regions of the display screen viewed by the user with two eyes wherein the viewing zones of each module of the multi-viewing zone 3D display system are free of skew;

FIG. 17A~FIG. 17C respectively show a flat display screen, a concaved display screen and a convexed display screen using the multi-viewing zone miniaturized imaging module according to an embodiment of the disclosure;

DETAILED DESCRIPTION OF THE DISCLOSURE

The disclosure mainly provides a miniaturized imaging module and a 3D display system using the same. Each of the miniaturized imaging modules is an independent projection unit, and the frames of the display regions of miniaturized imaging module are eliminated through the design of a special mechanism, so that the deterioration in the stereoscopic sense caused by the frame effect generated during the formation of a large-sized 3D display system is reduced. Also, to resolve the deterioration in the 3D image caused by positioning error during the projection of pixels, an image arrangement method is provided in an embodiment of the disclosure. According to the image arrangement method, the sub-pixels are re-arranged and re-grouped, so that system crosstalk which occurs during display is largely reduced, and the 3D image quality such as stereoscopic sense and representation of depth is greatly improved.

A number of preferred embodiments are disclosed below for elaborating the details of the disclosure. However, the 3D display system, the miniaturized imaging module and image arrangement that are disclosed in the embodiments of the disclosure are for elaborating the disclosure not for limiting the scope of protection of the disclosure.

<Miniaturized Imaging Module>

Figure 1:
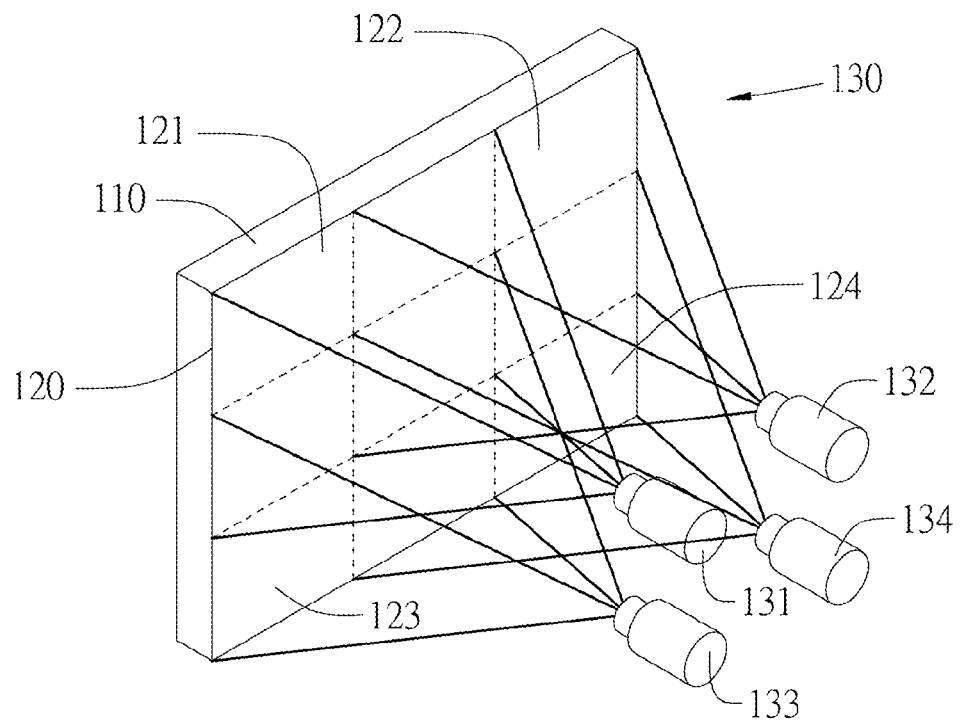
FIG. 1 shows a conventional 3D display system.
Figure 2:
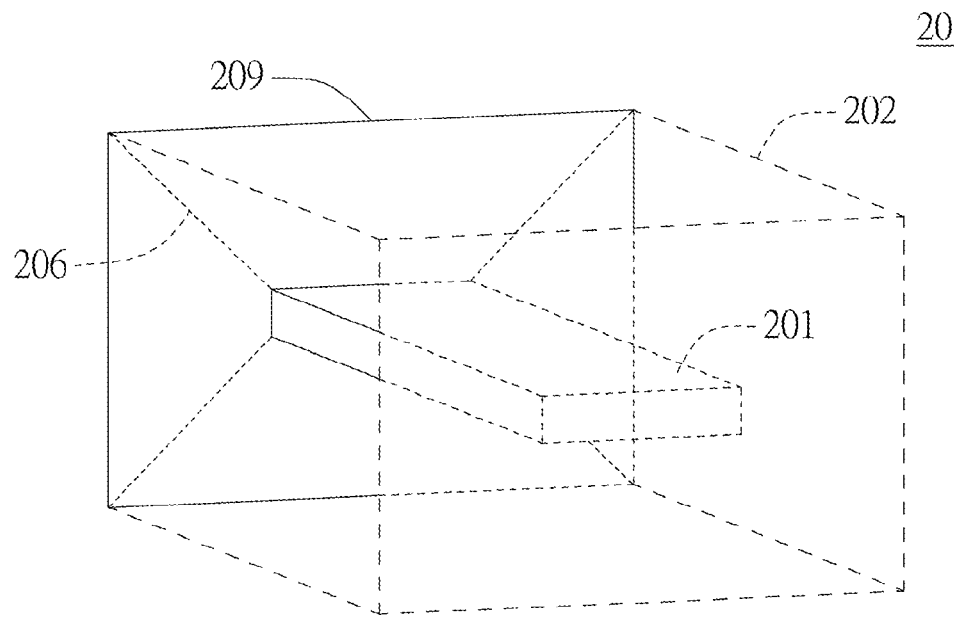
FIG. 2 shows a 3D view of a miniaturized imaging module according to an embodiment of the disclosure.
Figure 3:
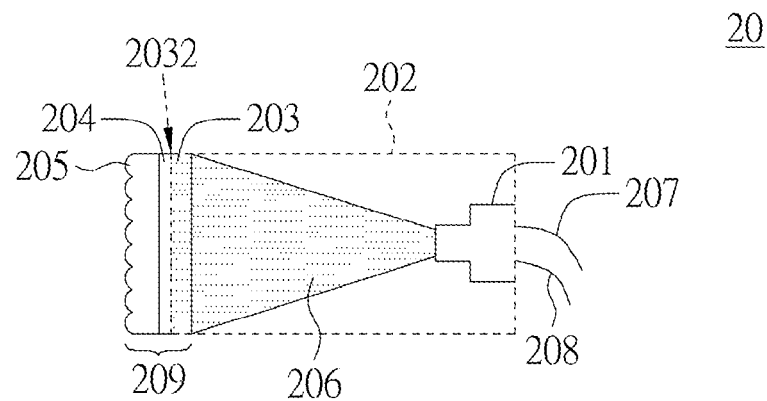
FIG. 3 shows a top view of a miniaturized imaging module according to an embodiment of the disclosure.
Figure 4:
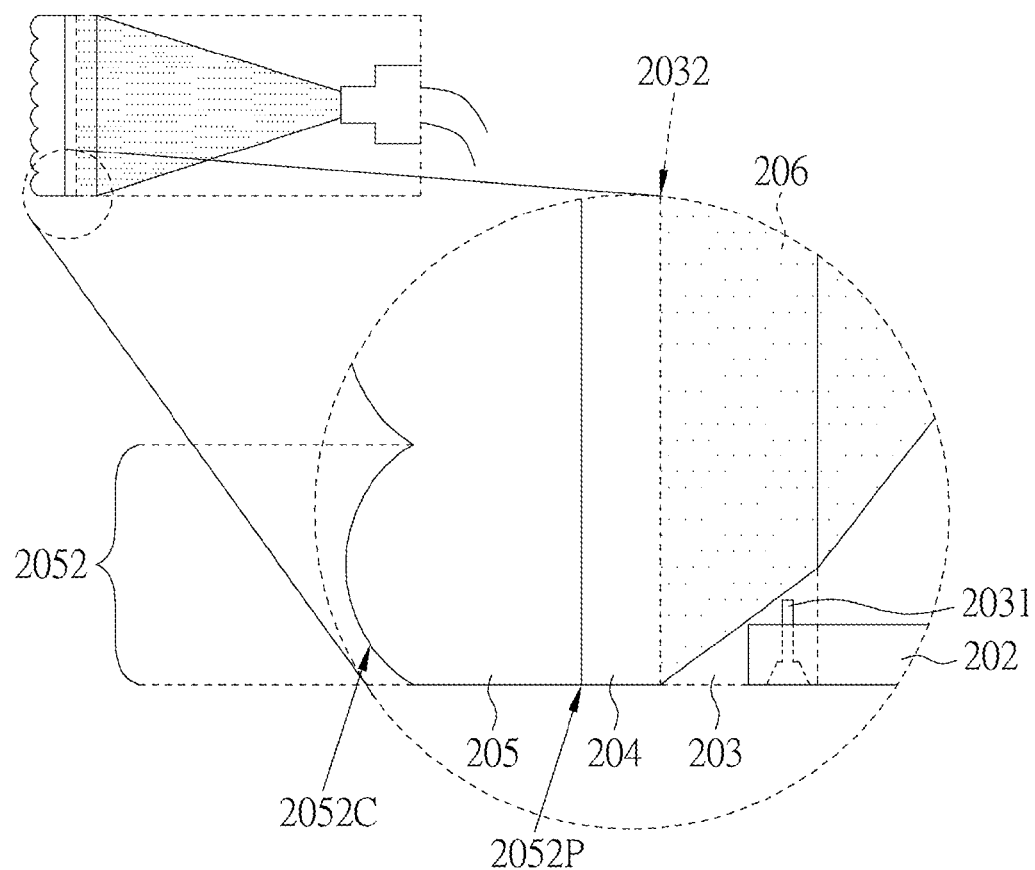
FIG. 4 shows a partial enlargement of FIG. 3.

Referring to FIG. 2, FIG. 3 and FIG. 4. FIG. 2 shows a 3D view of a miniaturized imaging module according to an embodiment of the disclosure. FIG. 3 shows a top view of a miniaturized imaging module according to an embodiment of the disclosure. FIG. 4 shows a partial enlargement of FIG. 3.

The miniaturized imaging module 20 includes a projection unit 201, a housing 202 and a viewing zone modulating screen 209. The housing 202 is used as a casing and a structural support for the miniaturized imaging module 20. The projection unit 201 is disposed on an inner side of the housing 202. The viewing zone modulating screen 209 is disposed on another inner side of the housing 202 and is opposite to the projection unit 201, wherein a correspondence relationship between the projection unit 201 and the viewing zone modulating screen 209 can be modulated. The projection unit 201 projects a to-be-displayed multi-viewing zone image onto the viewing zone modulating screen 209, which further distributes the projection multi-viewing zone image to different regions in the space, wherein two view images of the multi-viewing zone projection images belonging to different regions (or viewing zones) in the space to construct a 3D display image.

As indicated in FIG. 3, the viewing zone modulating screen 209 includes a fixing structure, a light diffusion layer 204 and a viewing zone modulating layer. In FIG. 3, the viewing zone modulating layer is exemplified by a lenticular plate 205. In the present embodiment, the fixing structure is implemented by a transparent structure frame 203 disposed on the housing 202 for fixing and modulating the correspondence relationship (such as relative positions or relative angles) between the projection unit 201 and the viewing zone modulating screen 209. The viewing zone modulating layer (such as the lenticular plate 205) is disposed in front of the fixing structure (that is, the transparent structure rim 203) for respectively projecting the corresponding multi-viewing zone images in a predetermined direction. The light diffusion layer 204 is disposed between the fixing structure (that is, the transparent structure frame 203) and the viewing zone modulating layer (ex: the lenticular plate 205 as shown in FIG. 3). For example, the light diffusion layer 204 is disposed on the front edge 2032 of the transparent structure frame 203. In addition, the power 207 provides necessary power to the miniaturized imaging module 20. After an image is inputted to the projection unit 201 from an image input line 208, the image is then forwarded towards the viewing zone modulating screen 209. Having received both the power and the image, the miniaturized imaging module 20 of the present embodiment is a display module that can be used independently.

In the present embodiment, the transparent structure frame 203 has a thickness, and can be connected to the housing 202 by a locking element, such as a screw, a rivet, a fastener, or an adhesive, for fixing the viewing zone modulating screen 209 and the projection unit 201 at relative positions to assure that the 3D image is not damaged. In FIG. 4, the locking element for fixing the transparent structure frame 203 and the housing 202 at relative positions is exemplified by a screw 2031, but the disclosure is not limited thereto.

Referring to FIG. 3 and FIG. 4. In the present embodiment, the transparent structure frame 203 and the housing 202 should not be positioned within the optical path inside the transparent structure frame 203 through which the refraction of the projected will pass. Thus, when the projection unit 201 projects a to-be-displayed multi-viewing zone image onto the viewing zone modulating screen 209, the projection multi-viewing zone image, after having been refracted by the transparent structure frame 203 with the image path 206 averting the screw 2031 (FIG. 4), completely reaches the front edge 2032 of the transparent structure frame 203 so as to completely reach the outmost edge of the light diffusion layer 204. Thus, in practical application, no matter a single miniaturized imaging module 20 is used or a plurality of miniaturized imaging modules 20 is stacked, only transparent frame appear in the display region of the entire image. Visually, no frame exists, and the edge of the image is exactly the edge of the screen. When a plurality of miniaturized imaging modules 20 is used, every two modules can be tightly jointed and the seam at the junction is minimized and becomes seamless to the viewer who views the screen at an appropriate distance and beyond.

Despite in the above embodiment, the connection between the viewing zone modulating screen 209 and the housing 202 is mainly implemented by the transparent structure frame 203, and the fixing of the viewing zone modulating screen 209 and the housing 202 is implemented by using the screw 2031 as a locking element, the disclosure is not limited thereto, and the above connection and fixing can be implemented through other mechanisms as well. In practical application, if the fixing structure uses other locking elements for fixing the transparent structure frame 203 on the housing 202, then the optical path of the projection multi-viewing zone image should be designed to avert the locking element and be able to completely reach the front edge 2032 of the transparent structure frame 203.

Furthermore, the viewing zone modulating layer of the viewing zone modulating screen 209 can be implemented by a barrier layer (FIG. 9) or any other structures capable of forming a plurality of viewing zones in front of the viewing zone modulating screen 209 in addition to being implemented by the lenticular plate 205. When the lenticular plate 205 and the barrier layer 401 are used as a viewing zone modulating layer, the imaging and the guiding of viewing zones are disclosed below.

Lenticular Plate

The lenticular plate 205, being used as a viewing zone control layer of the viewing zone modulating screen 209, is disposed in front of the transparent structure frame 203 for respectively projecting the corresponding multi-viewing zone images in a predetermined direction. Wherein, the lenticular plate 205 includes a plurality of lenticular lenses 2052 arranged in parallel to form a lens array, wherein each lenticular lens 2052 has a curved surface $2052c$ and a planar surface $2052p$ (or, in another embodiment, each lenticular lens has two curved surfaces), and the planar surface $2052p$ faces the transparent structure frame 203. However, the disposition of the lenticular plate 205 is not limited to the construction as shown in FIG. 4. Besides facing the planar surface $2052p$ to the transparent structure frame 203, setting the focal plane of the curved surface $2052c$ or the planar surface $2052p$ of the lenticular plate 205 on the transparent structure frame 203 in other embodiments would produce the same effect. The light diffusion layer 204 is disposed on the focal plane of the lenticular lens and is connected thereto. For example, in FIG. 4, the light diffusion layer 204 is disposed on the focal plane formed by the planar surface $2052p$ of each lenticular lens of the lenticular plate 205. Moreover, the lenticular lenses 2052 of the lenticular plate 205 have a screen tilted angle with respect to a vertical reference direction. It can be designed that one of the image rotation angle and the screen tilted angle is equal to 0 degree and the other is not 0 degree (that is, at least one is equal to 0 degree), or, both of the image rotation angle and the screen tilted angle are larger than 0 degree. In practical application, the image rotation angle and the screen tilted angle can be implemented through the rotation of the image or the screen angle. Thus, whether to adopt the slanted disposition (such as FIG. 7A, FIG. 7B, FIG. 8B, FIG. 10) or the vertical disposition (such as FIG. 6A, FIG. 6B, FIG. 8A) is determined according the terms in actual application.

When the lenticular plate is used as a viewing zone modulating layer 205, the imaging and the guiding of viewing zone are disclosed below.

Figure 5:
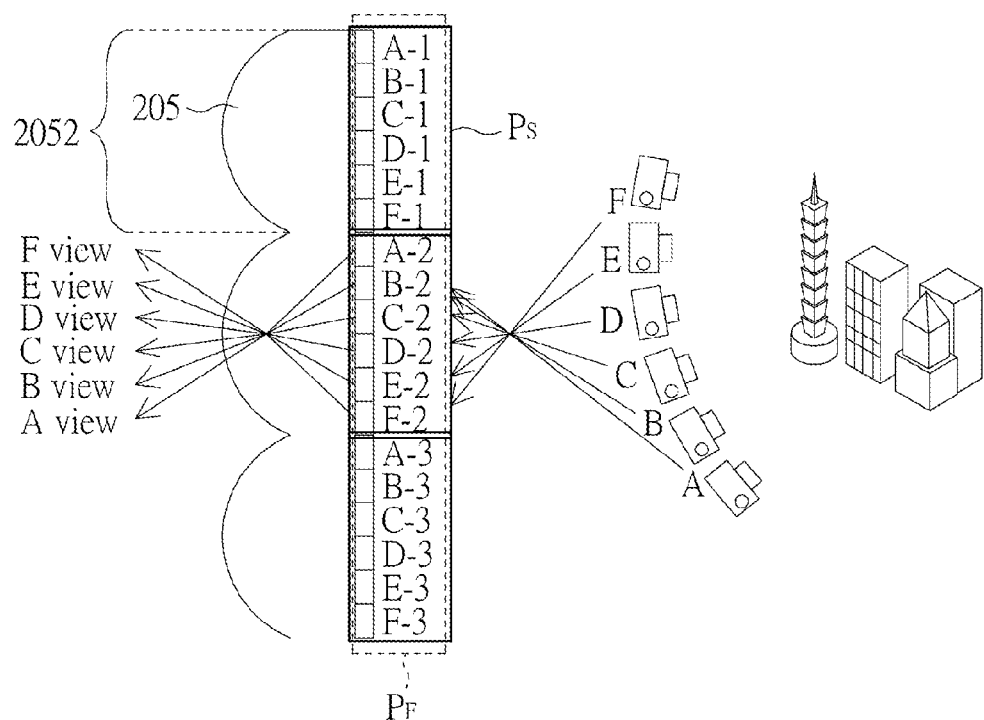
FIG. 5 shows the imaging theory when the lenticular plate is used as a viewing zone modulating layer according to an embodiment of the disclosure.

Referring to FIG. 5, the imaging theory when the lenticular plate is used as a viewing zone modulating layer according to an embodiment of the disclosure is shown. As indicated in FIG. 5, the image of a material scene is captured by a camera at six different view-angles A~F, wherein A denotes the image frame of the first view-angle, A-1 denotes the first pixel in the image frame of the first view-angle, and the rest may be deduced by analogy. Each lenticular lens 2052 of the lenticular plate 205 corresponds to a 3D pixel PS, such as formed by the pixels A-1, B-1~F-1. A plurality of 3D pixels PS constructs a complete 2D pixel PF.

Figure 6A:
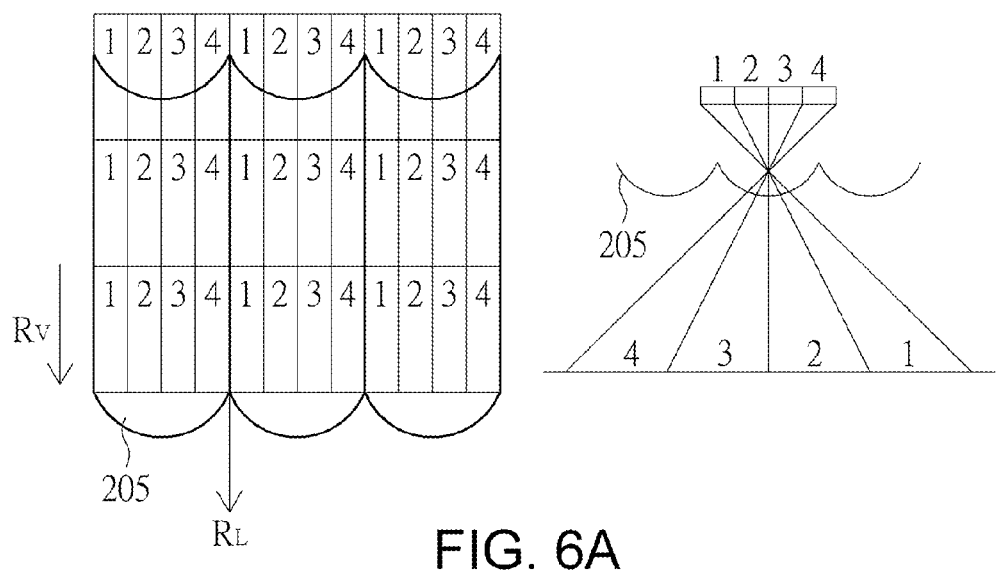
FIG. 6A shows the guiding of viewing zones when the vertically disposed lenticular plate of the miniaturized imaging module is used according to an embodiment of the disclosure.

FIG. 6A illustrates the viewing zones when the vertically disposed lenticular plate of the miniaturized imaging module is used according to an embodiment of the disclosure. The projection unit 201 projects an image onto the light diffusion layer 204 through the transparent structure frame 203 to form a projection image, which is further guided by the lenticular plate 205. The image pixels having the same relative position with the lenticular plate 205 are guided in the same direction, and the image pixels having different relative positions with the lenticular plate 205 are guided to different direction, so that a plurality of viewing zones is formed. In FIG. 6A, the vertically disposed lenticular plate 205 and four viewing zones 1-4 are taken for exemplification. The lenticular lenses of the lenticular plate 205 has a screen tilted angle RL with respect to a vertical reference direction RV, which is parallel to the screen tilted angle RL. After passing through the lenticular plate 205, the pixels (or subpixels) 1, 2, 3, 4 with different relative positions are guided in different directions. The pixels in front of the lenticular plate 205 (that is, the viewer's end) form a plurality of viewing zones 1, 2, 3, 4, wherein the viewing zone 1 formed by the pixel 1 relatively located at the left-hand side of the lenticular plate 205 tilts to the right, and the viewing zone 4 formed by the pixel 4 relatively located at the right-hand side of the lenticular plate 205 tilts to the left. Meanwhile, on the part of the single viewing zone of FIG. 6A, the horizontal resolution is only ¼ of that of the original panel resolution, and the vertical resolution is the same with that of the original panel resolution.

Figure 6B:
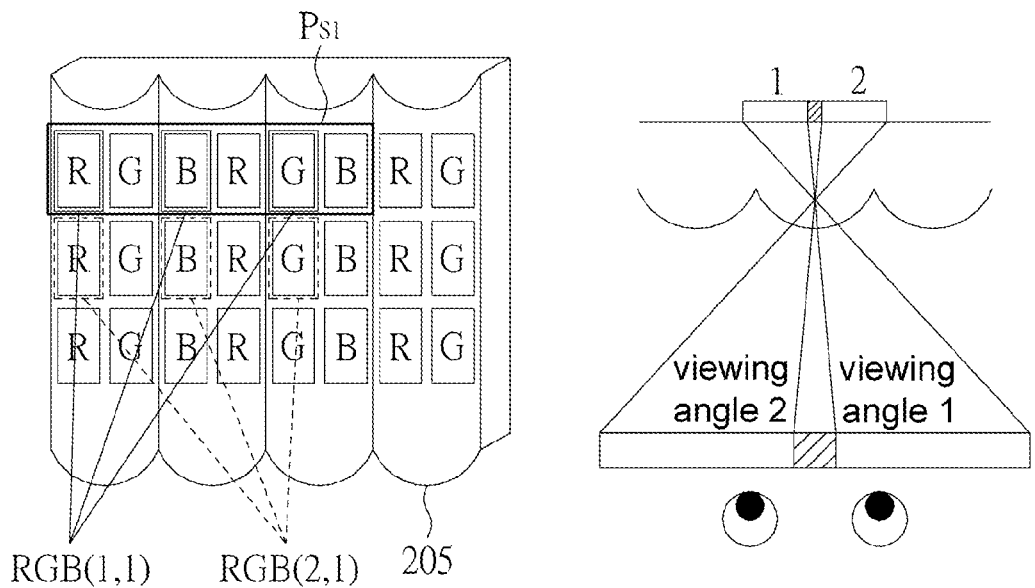
FIG. 6B shows the generation of a 3D image when vertically disposed lenticular plate of the miniaturized imaging module is used according to an embodiment of the disclosure.

Referring to FIG. 6B, the generation of a 3D image using vertically disposed lenticular plate of the miniaturized imaging module according to an embodiment of the disclosure is shown. Wherein, the pixel PS1 denotes the first 3D pixel, the subpixel RGB (1, 1) denotes the first view-angle sub-pixel RGB in the first row of the first 3D pixel, and the subpixel RGB (2, 1) denotes the first view-angle sub-pixel RGB in the second row of the first 3D pixel. When the viewer's two eyes view the images having different view-angles (such as view-angle 1 and view-angle 2), the stereoscopic sense of image is generated. In FIG. 6B, the horizontal resolution of 3D pixel is only ½ of that of the original 2D pixel, and the vertical resolution of 3D pixel is the same with that of the original 2D pixel.

The lenticular plate 205 can be disposed in the manner of a slanted disposition in addition to the vertical disposition (that is, non-slanted disposition) indicated in FIG. 6A~FIG. 6B.

Figure 7A:
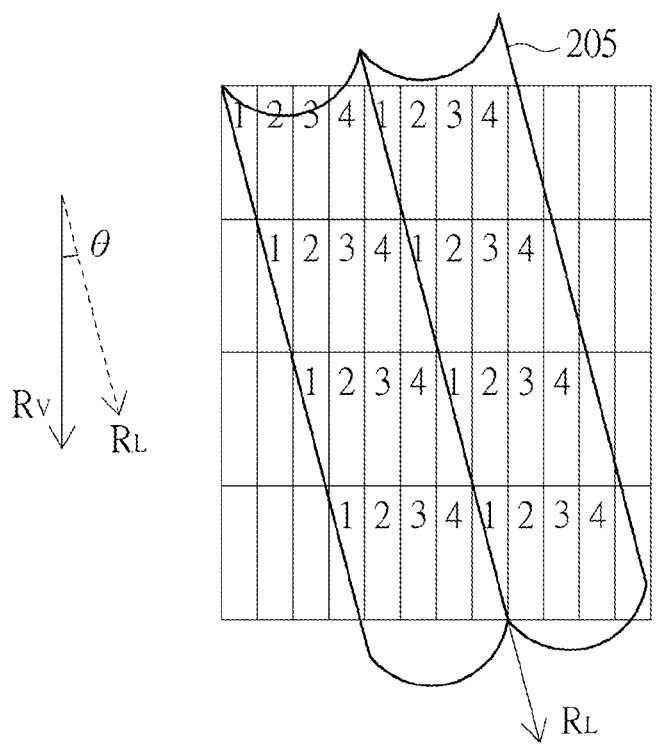
FIG. 7A shows a slantedly disposed lenticular plate of the miniaturized imaging module used in an embodiment of the disclosure.

Referring to FIG. 7A, a slantedly disposed lenticular plate of the miniaturized imaging module used in an embodiment of the disclosure is shown. In FIG. 7A, four viewing zones 1-4 are used for exemplification. The lenticular lenses of the lenticular plate 205 have a screen tilted angle RL with respect to a vertical reference direction RV, wherein an angle θ is contained between the vertical reference direction RV and the screen tilted angle RL. The slantedly disposed lenticular plate 205 has a function for balancing horizontal and vertical resolution. Meanwhile, the decrement in resolution is equally distributed to the horizontal and the vertical direction, the horizontal resolution of single viewing zone is ¾ of that of the original panel resolution, and the vertical resolution of single viewing zone is ⅓ of that of the original panel resolution.

Figure 7B:
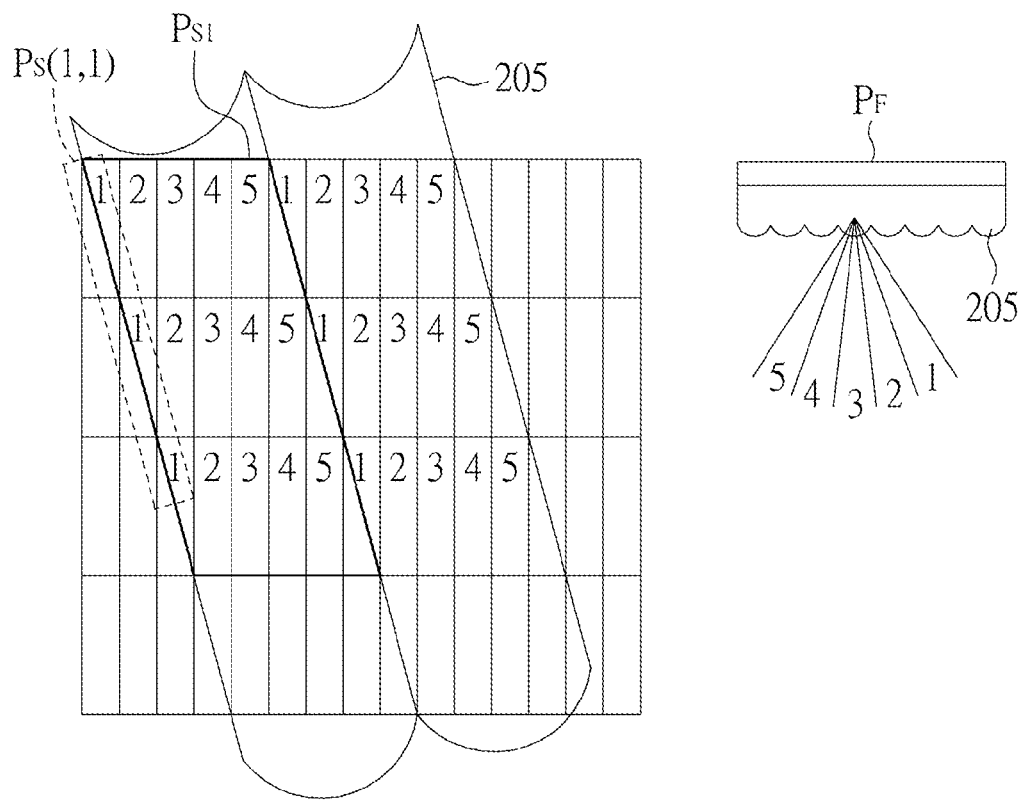
FIG. 7B shows the generation of a 3D image with five viewing zones when a slantedly disposed lenticular plate of the miniaturized imaging module is used according to an embodiment of the disclosure.

FIG. 7B shows the generation of a 3D image with five viewing zones when a slantedly disposed lenticular plate of the miniaturized imaging module is used according to an embodiment of the disclosure. Wherein the pixel PS1 denotes the first 3D pixel, and the pixel PS (1, 1) denotes the first pixel of the first view-angle in the first 3D pixel. Through the slantedly disposed lenticular plate 205, the horizontal resolution of the 3D pixel of FIG. 7B is ⅗ of that of the original 2D pixel, and the vertical resolution of the 3D pixel is ⅓ of that of the original 2D pixel.

Figure 8A:
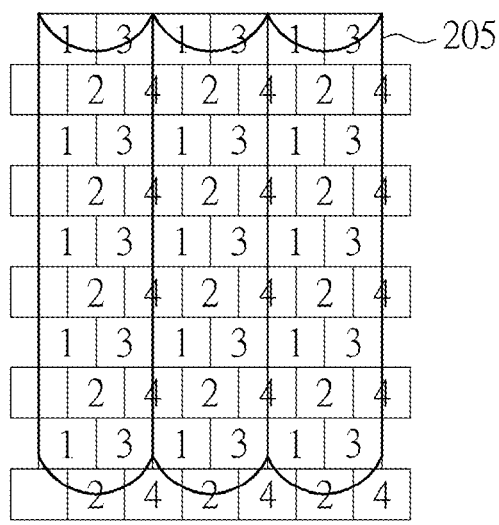
FIG. 8A shows the pixels of delta arrangement in cooperation with a vertically disposed lenticular plate according to an embodiment of the disclosure.
Figure 8B:
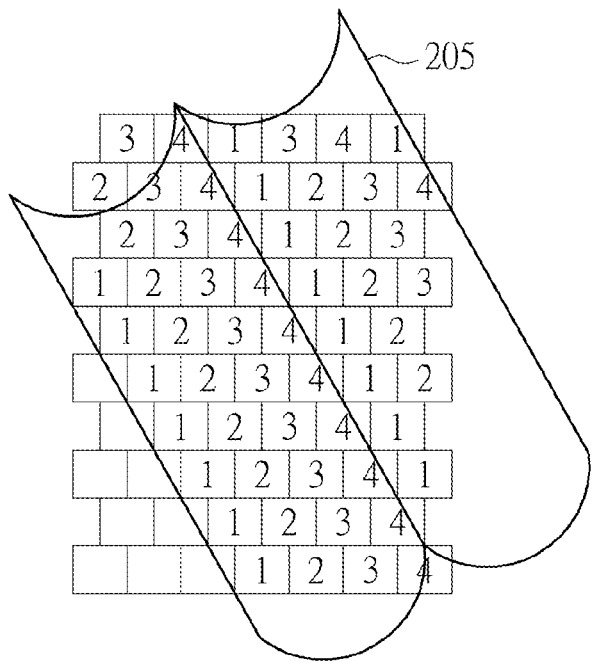
FIG. 8B shows the pixels of delta arrangement in cooperation with a slantedly disposed lenticular plate according to an embodiment of the disclosure.

Moreover, if the image pixels are not arranged according to the RGB strip arrangement as indicated in FIG. 6A~FIG. 6B and FIG. 7A~FIG. 7B but are arranged according to delta arrangement, then the vertical disposition and the slanted disposition of the lenticular plate 205 still can be used. Referring to FIG. 8A~FIG. 8B. FIG. 8A shows the pixels of delta arrangement in cooperation with a vertically disposed lenticular plate according to an embodiment of the disclosure. FIG. 8B shows the pixels of delta arrangement in cooperation with a slantedly disposed lenticular plate according to an embodiment of the disclosure.

Barrier Layer

Figure 9:
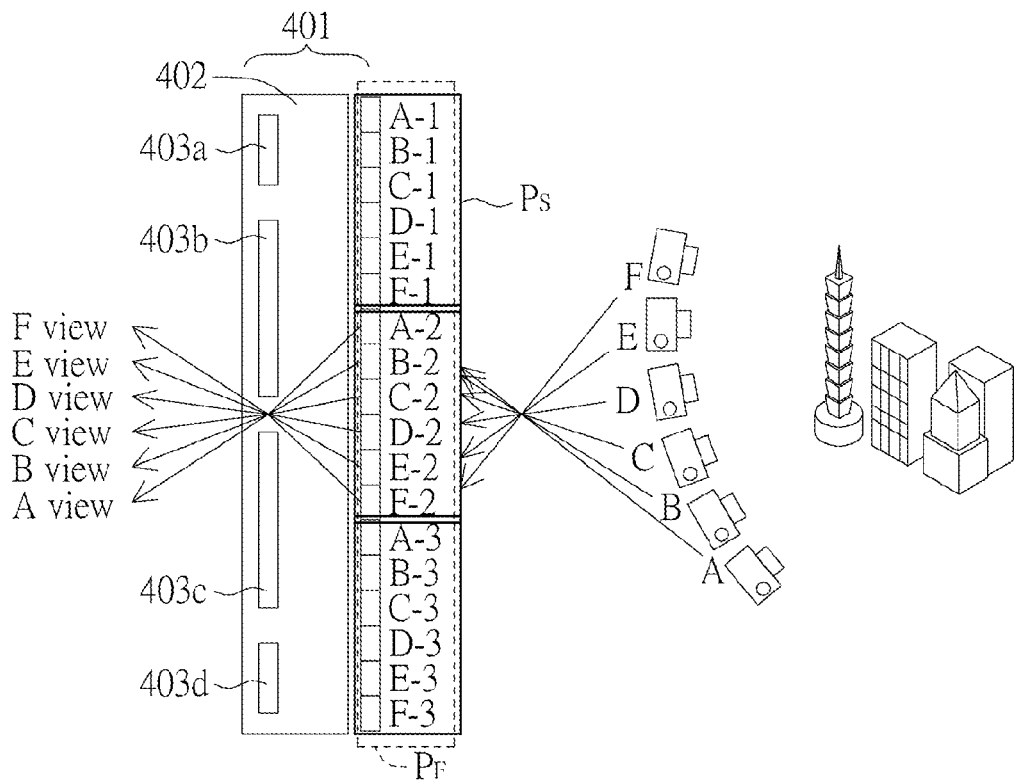
FIG. 9 shows an imaging theory when a barrier layer is used as a viewing zone modulating layer of the miniaturized imaging module according to an embodiment of the disclosure.

FIG. 9 shows the imaging theory when a barrier layer is used as a viewing zone modulating layer of the miniaturized imaging module according to an embodiment of the disclosure. The barrier layer 401 is a transparent layer 402 with a plurality of strip region 403a~403d formed thereon, wherein the strip regions 403a~403d are arranged in parallel by a distance. Likewise, as indicated in FIG. 9, the image of a material scene is captured by a camera at six different view-angles A~F, wherein A denotes the image frame of the first view-angle, A-1 denotes the first pixel in the image frame of the first view-angle, and the rest may be deduced by analogy. A-1, B-1, C-1, D-1, E-1 and F-1 construct a 3D pixel PS, and a plurality of 3D pixels PS constructs a complete 2D pixel PF.

Like the lenticular plate 205 of the above embodiment, the barrier layer 401 can be vertically disposed (that is, non-slanted disposition) or slantedly disposed. Thus, the strip regions 403a~403d of the barrier layer 401 has a screen tilted angle RL (equal to 0 degree or larger than 0 degree) with respect to a vertical reference direction RV. When vertical disposition is adopted, the screen tilted angle RL is equal to 0 degree; when slanted disposition is adopted, an angle θ is contained between the screen tilted angle RL and the vertical reference direction RV.

Figure 10:
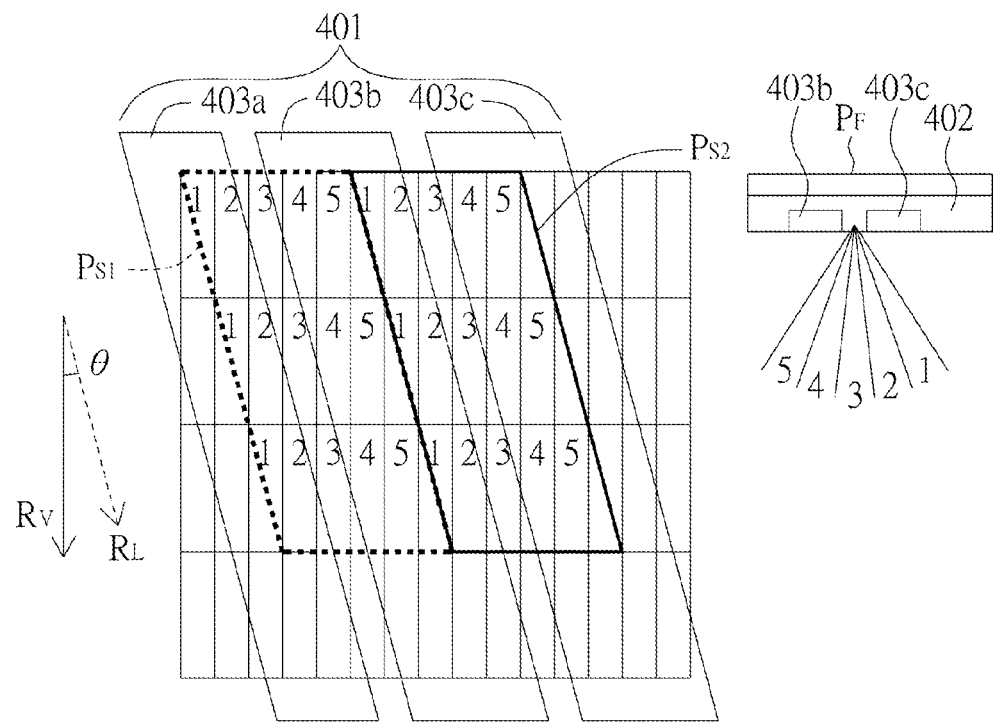
FIG. 10 shows the generation of a 3D image with five viewing zones when a slantedly disposed barrier layer of the miniaturized imaging module is used according to an embodiment of the disclosure.

FIG. 10 shows the generation of a 3D image with five viewing zones when a slantedly disposed barrier layer of the miniaturized imaging module is used according to an embodiment of the disclosure. Wherein, the pixel PS1 denotes the first 3D pixel, and the pixel PS2 denotes the second 3D pixel. Through the slantedly disposed barrier layer 401, the horizontal resolution of the 3D pixel of FIG. 10 is ⅗ of that of the original 2D pixel, and the vertical resolution of the 3D pixel is ⅓ of that of the original 2D pixel.

Figure 11:
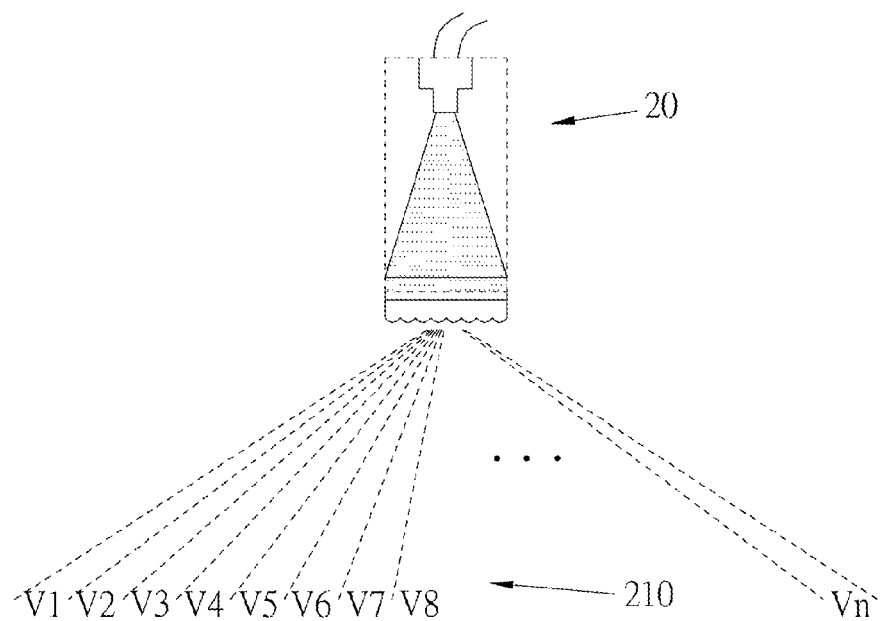
FIG. 11 shows a multi-viewing zone miniaturized imaging module according to an embodiment of the disclosure.

Regardless which of the lenticular plate 205 and the barrier layer 410 is used, the image eventually outputted by the single miniaturized imaging module 20 of the present embodiment is a 3D image with a plurality of viewing zones, as indicated in FIG. 11. The miniaturized imaging module 20 has n viewing zones 210, namely, viewing zones V1, V2 ... Vn, wherein n is a positive integer).

3D Display System

Figure 12:
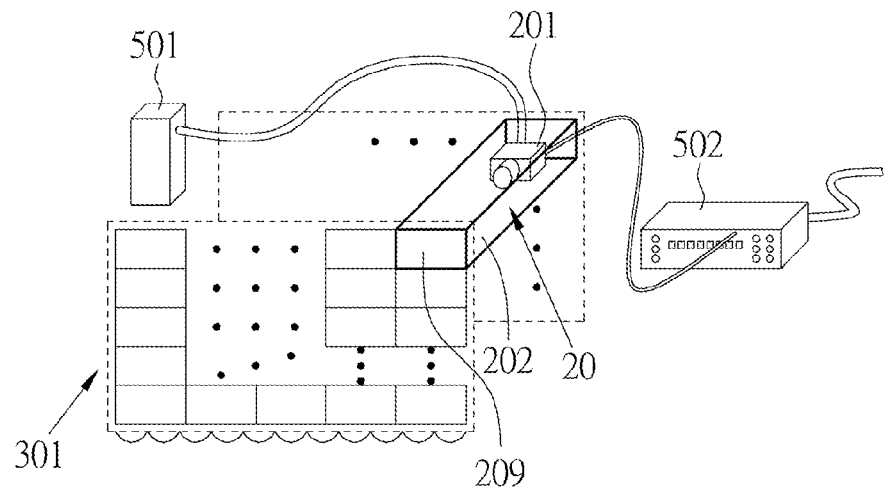
FIG. 12 shows a multi-viewing zone 3D display system according to an embodiment of the disclosure.

A multi-viewing zone 3D display system can be formed by a plurality of multi-viewing zone miniaturized imaging modules 20 disclosed in above embodiments. FIG. 12 shows a multi-viewing zone 3D display system according to an embodiment of the disclosure. The multi-viewing zone 3D display system includes an image output module 501, a power distribution device 502, and a plurality of miniaturized imaging modules 20. In response to actual needs, the miniaturized imaging modules 20 can be arranged as a one-dimensional array or a two-dimensional array to form a multi-viewing zone 3D display system. Also, a certain number of miniaturized imaging modules 20 can be stacked in an irregular shape to form a multi-viewing zone 3D display system, and the disclosure does not impose particular restriction regarding the grouping or arrangement of the miniaturized imaging modules 20. The image output module 501 is implemented by an image output control unit for processing the dynamic or static multi-viewing zone images coming from an image player, a computer, a network, or other sources, and then distributes and transmits the processed images to each of the multi-viewing zone miniaturized imaging modules 20 for display, wherein examples of image processing include reconstruction, segmentation, and brightness and color adjustment. The power distribution device 502 is electrically connected to the multi-viewing zone miniaturized imaging modules 20 for distributing and providing necessary power to each of the multi-viewing zone miniaturized imaging modules 20.

The projection unit 201 of each of the multi-viewing zone miniaturized imaging modules 20 projects an image onto respective viewing zone modulating screen 209, and forms a plurality of viewing zones in front of the viewing zone modulating screens 209, wherein the image is a segmented image composed of a plurality of images having different view-angles. Of the segmented image formed by the viewing zone modulating screens 209, every two adjacent segmented images are tightly jointed. The viewing zone modulating screens 209 of all multi-viewing zone miniaturized imaging modules 20 form a display screen 301 of the 3D display system.

Figure 13:
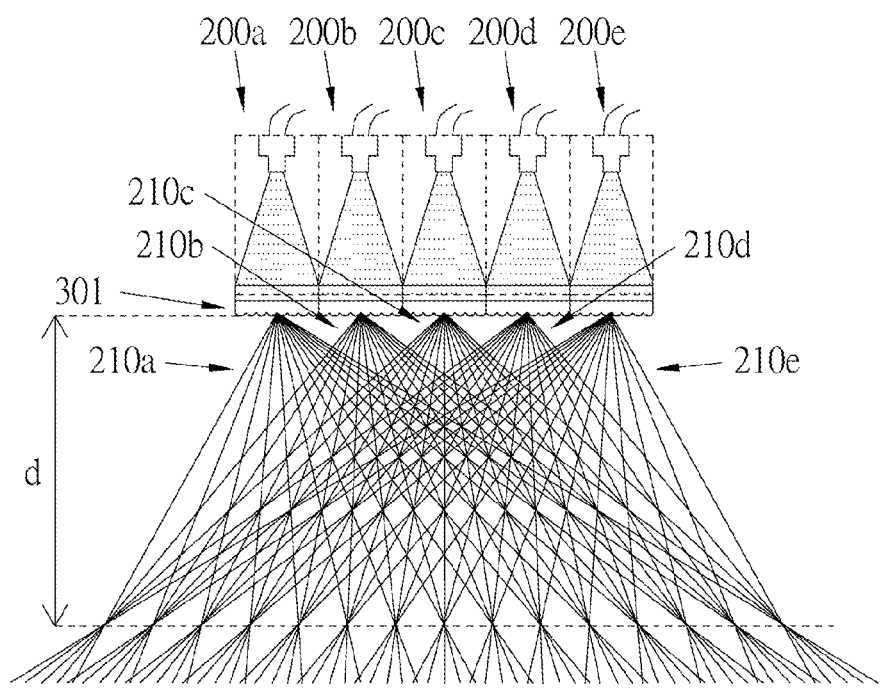
FIG. 13 shows a top view of multi-viewing zone 3D display system with skewed viewing zones according to an embodiment of the disclosure.

Of the multi-viewing zone 3D display system which is formed by a plurality of multi-viewing zone miniaturized imaging modules, the viewing zones generated by each of the multi-viewing zone miniaturized imaging modules are skewed to different directions according to the position of the multi-viewing zone miniaturized imaging module in the entire system, hence resulting in the overlapped of viewing zones. FIG. 13 shows a top view of multi-viewing zone 3D display system with skewed viewing zones according to an embodiment of the disclosure. In FIG. 13, if the multi-viewing zone 3D display system is composed of five multi-viewing zone miniaturized imaging modules 200a~200e, the miniaturized imaging module 200c denotes the multi-viewing zone miniaturized imaging module positioned in the middle of the system. The miniaturized imaging modules 200a and 200b denote the multi-viewing zone miniaturized imaging modules skewed to the left of the system, wherein the miniaturized imaging module 200a is positioned further to the left of the miniaturized imaging module 200b. The miniaturized imaging module 200d and 200e denotes the multi-viewing zone miniaturized imaging modules skewed to the right of the system, wherein the miniaturized imaging module 200e is positioned further to the right of the miniaturized imaging module 200d. A plurality of viewing zones 210c generated by the miniaturized imaging module 200c is positioned in the middle. The viewing zones 210a and 210b generated by the miniaturized imaging module 200a and 200b respectively are skewed to the right, and overlap the viewing zone 210c at a position which is a distance d to the display screen 301 (the first viewing zone overlaps the first viewing zone, the second viewing zone overlaps the second viewing zone, and the rest may be deduced by analogy), wherein the skew angle of the viewing zone 210a is even larger than the viewing zone 210b. Likewise, the viewing zones 210d and 210e generated by the miniaturized imaging modules 200d and 200e respectively are skewed to the left, and overlap the viewing zone 210c at a position which is a distance d to the display screen 301 (the first viewing zone overlaps the first viewing zone, the second viewing zone overlaps the second viewing zone, and the rest may be deduced by analogy), wherein the skew angle of the viewing zone 210e is even larger than the viewing zone 210d.

Figure 14:
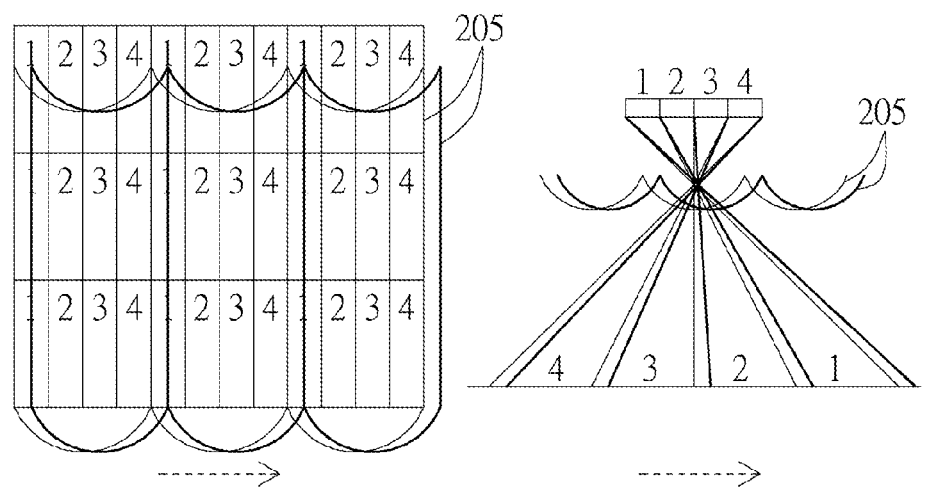
FIG. 14 shows the skew of viewing zones in a multi-viewing zone 3D display system according to an embodiment of the disclosure.

The viewing zones generated by the multi-viewing zone miniaturized imaging modules can be skewed to the left or the right by adjusting the horizontal relative position between the lenticular plate 205 (viewing zone modulating layer) and the image pixel. FIG. 14 shows the skew of viewing zones in a multi-viewing zone 3D display system according to an embodiment of the disclosure. The viewing zones generated with the image pixels remaining still and the lenticular plate 205 being shifted to the right will be skewed to the right, and the viewing zones generated with the image pixels remaining still and the lenticular plate 205 being shifted to the left will be skewed to the left as indicated in FIG. 14.

Figure 15:
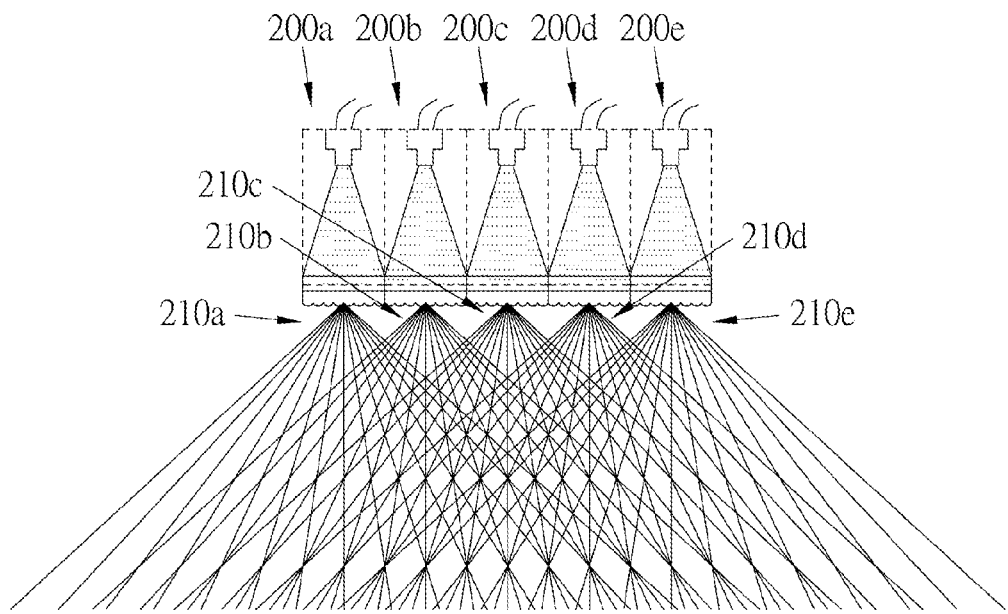
FIG. 15 shows a top view of a multi-viewing zone 3D display system with non-skewed viewing zones according to an embodiment of the disclosure.

In the present embodiment, the viewing zones generated by each of the multi-viewing zone miniaturized imaging modules of the multi-viewing zone 3D display system of FIG. 13 are skewed in different directions according to the position of the miniaturized imaging module to generate the overlapped of viewing zones. In an application case, the viewing zones generated by all multi-viewing zone miniaturized imaging modules are identical and free of skew. FIG. 15 shows a top view of a multi-viewing zone 3D display system with non-skewed viewing zones according to an embodiment of the disclosure. All the multi-viewing zone miniaturized imaging modules 200a~200e of such multi-viewing zone 3D display system are identical, so the related adjustment, maintenance and replacement are made easier. When the user views an image with such system, the different horizontal regions on the display screen that are viewed by the user are provided from different viewing zones, but the two eyes still maintain correct parallax as indicated in FIG. 16. FIG. 16 shows the viewing zones on different regions of the display screen viewed by the user with two eyes wherein the viewing zones of each module of the multi-viewing zone 3D display system are free of skew. Due to the large number of the viewing zones, the differences between the view-angles of the viewing zones are very limited and will not cause any problem to image viewing.

Each miniaturized imaging module, being an independent 3D display, can be used in the application of a flat or non-flat display. FIG. 17A~FIG. 17C respectively show a flat display screen, a concaved display screen and a convexed display screen using the multi-viewing zone miniaturized imaging module according to an embodiment of the disclosure. As indicated in FIG. 17B, FIG. 17C, when applied to the curved surface or the parabolic surface, the braces of the housings 202' and 202" are well designed and adjusted so that the formed display array can be cambered as requested, the screen is tightly jointed, and the housing 202, 202' and 202" are not interfered with. Thus, the miniaturized imaging module of the present embodiment is very flexible in application.

Figure 18:
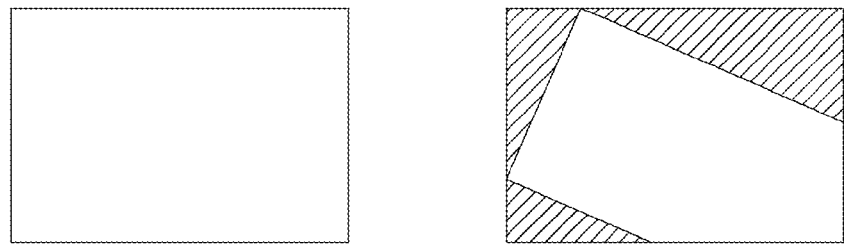
FIG. 18 shows an irregularly patched display region.

Also, a complicated shape of the display can be achieved by controlling the position of image output. FIG. 18 shows an irregularly patched display region. As indicated in FIG. 18, the left-hand side is an ordinary display screen, and parts of image pixels (on the right-hand side) can be turned off, thereby facilitating the image patching.

Ways of Image Arrangement

Figure 19:
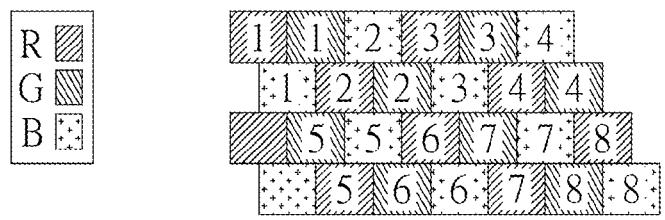
FIG. 19 shows an original delta arrangement of pixels.
Figure 20:
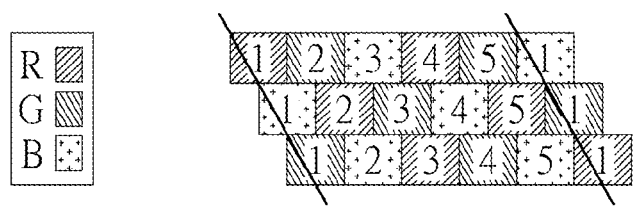
FIG. 20 shows an arrangement of a 3D display.

To enhance the 3D effect of the 3D display, the present embodiment discloses a method for rearranging the pixels to decrease the occurrence of crosstalk in each viewing zone. A delta arrangement of pixels is exemplified in FIG. 19, which shows an original delta arrangement of pixels, wherein every three RGB sub-pixels are grouped to construct a pixel. For example, the sub-pixels R1/G1/B1 construct a pixel. When the present embodiment is applied to the 3D display using a lenticular plate (equipped with lenticular lens) or a grating, the pixel arrangement will be varied in accordance with the optical design. To display the image of each viewing zone in the space, the RGB sub-pixels need to be re-arranged as illustrated in FIG. 20 for displaying a 3D image.

Figure 21:
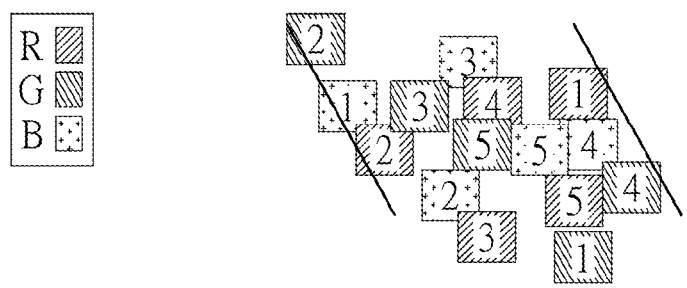
FIG. 21 shows a disordered arrangement of the pixels of FIG. 19 after projection.

However, if the arrangement method of the present embodiment is used in a projection system, since the projection image is distorted and dispersed as indicated in FIG. 21, the arrangement of the RGB sub-pixels will be disordered after projection. That is, the positions of the RGB sub-pixels will vary slightly. Such variation is hard to be noticed by the viewer's eyes if a 2D display system is used, but will make the system crosstalk serge and cause discomfort to the viewer's eyes if a 3D display system is used. Meanwhile, the stereoscopic sense and representation of depth of 3D image may easily be damaged.

Figure 22:
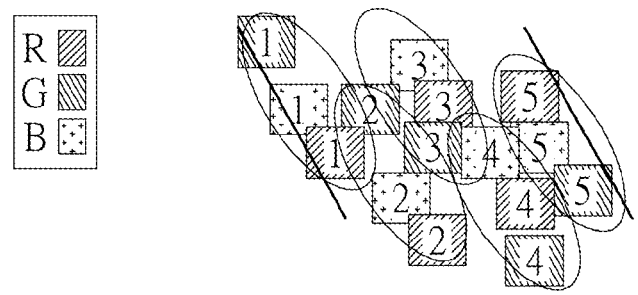
FIG. 22 shows the re-arrangement of the position and the grouping of the sub-pixels of FIG. 21.

Through the re-arrangement of the RGB sub-pixels, the pixels are re-grouped as indicated in FIG. 22, and the neighboring sub-pixels of FIG. 21 are grouped together. For example, the sub-pixels G2/B1/R2 of FIG. 21 are re-grouped as the sub-pixel G1/B1/R1 of FIG. 22, and the sub-pixels G3/B2/R3 of FIG. 21 are re-grouped as the sub-pixel G2/B2/R2 of FIG. 22. The selection of sub-pixels is based on the position closest for 3D display, and the re-arrangement of the positions and the grouping of the RGB sub-pixels position largely reduce the likelihood of crosstalk occurring to the 3D display system and enhance the image quality of the 3D image. Also, the two slashed lines in FIG. 19~FIG. 22 denote the two edges of the lenticular plate.

A method for re-arranging and re-grouping the RGB sub-pixel through a test pattern is disclosed below.

Figure 23:
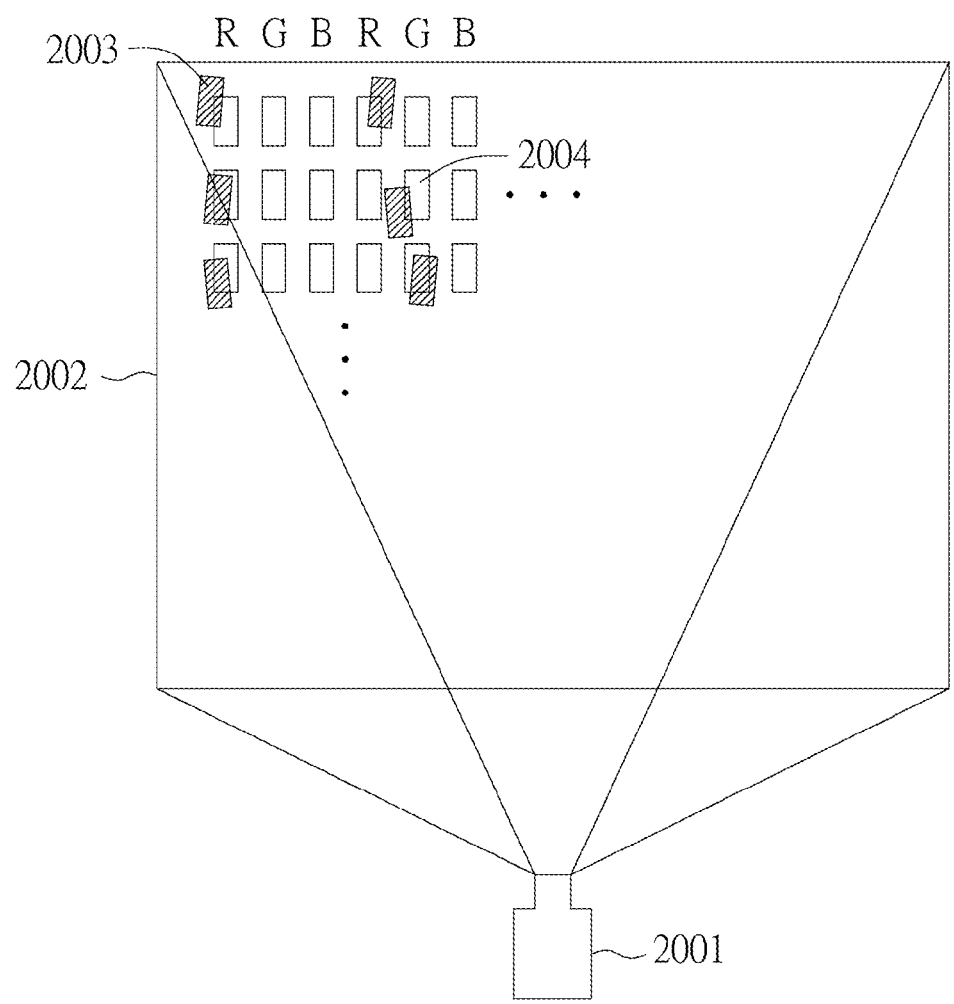
FIG. 23 shows a method for defining the positions of sub-pixels through the use of a test pattern according to an embodiment of the disclosure.

FIG. 23 shows a method for defining the positions of sub-pixels through the use of a test pattern according to an embodiment of the disclosure. FIG. 23 includes an image-capturing device 2001, an image setting screen 2002, an actual sub-pixel setting position 2003, and a sub-pixel ideal position 2004. To define the position of a sub-pixel, the image-capturing device 2001 is used for capturing an image from the image setting screen 2002, the position of each sub-pixel is located according to the test pattern of FIG. 24, and at last the setting position of the sub-pixel is located through the test pattern, which is a solely R or G or B full-screen as indicated in FIG. 24.

Figure 25:
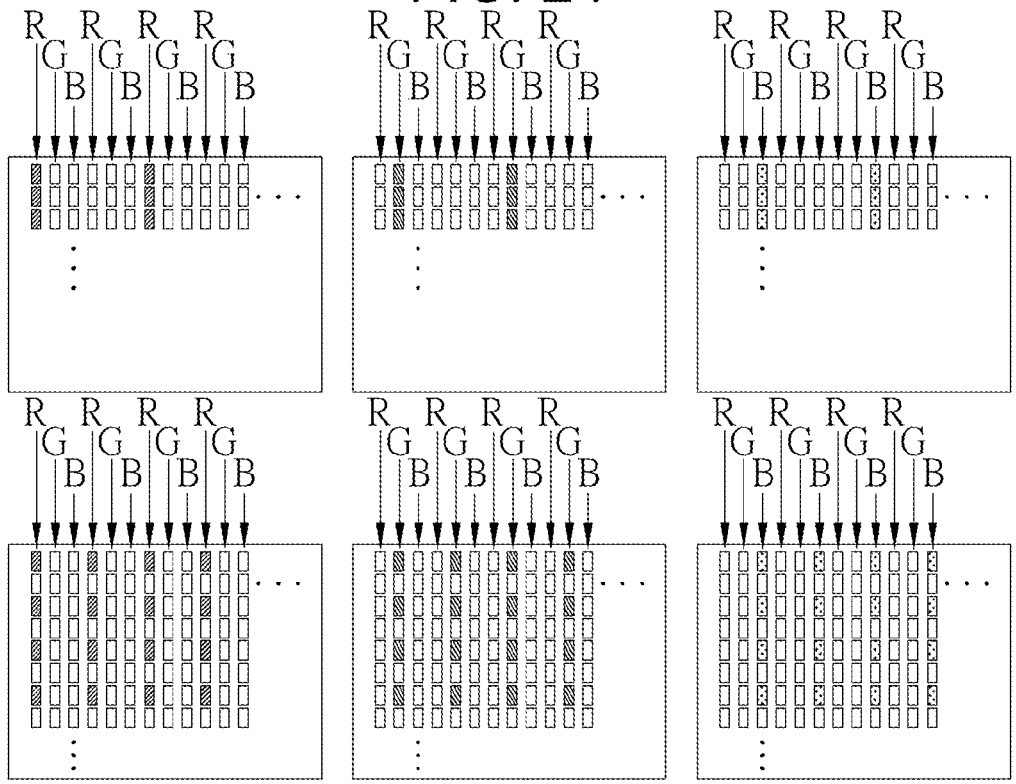
FIG. 25 shows a test pattern with the interval of respective pixel R, G, B being increased by 1 pixel.
Figure 26:
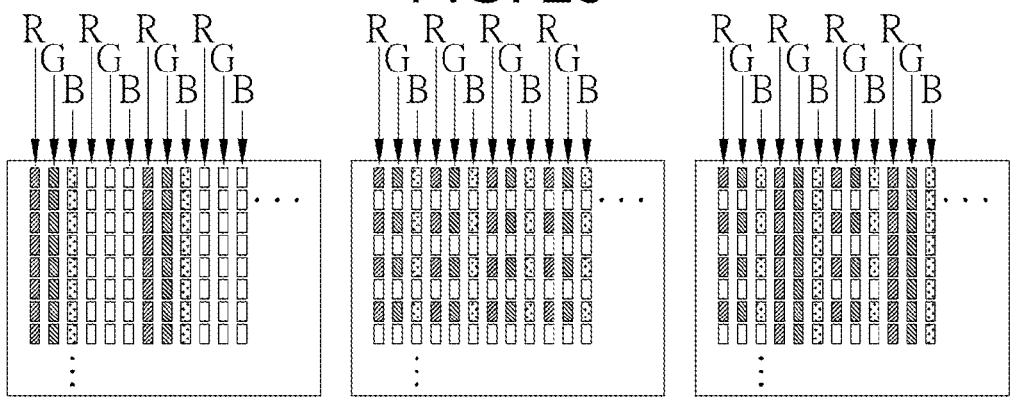
FIG. 26 shows the test patterns in the shape of vertical line, horizontal line and grating pattern.

When defining the positions of the sub-pixels, if frame distortion and color dispersion are so severe that the position cannot be defined, the test pattern of FIG. 25 can be used for defining the positions of the sub-pixels. That is, the interval of individual sub-pixel is increased. FIG. 25 shows a test pattern with the interval of respective pixel R, G, B being increased by one pixel. Also, the test patterns of FIG. 26 can be used for defining the positions of the sub-pixels. In FIG. 26, the test patterns illustrated from left to right are in the shape of vertical line, horizontal line pattern and grating pattern. If the distortion and dispersion in the distribution of the sub-pixels are too severe, the intervals of the sub-pixels can be further increased for defining the positions of the sub-pixels.

Figure 24:
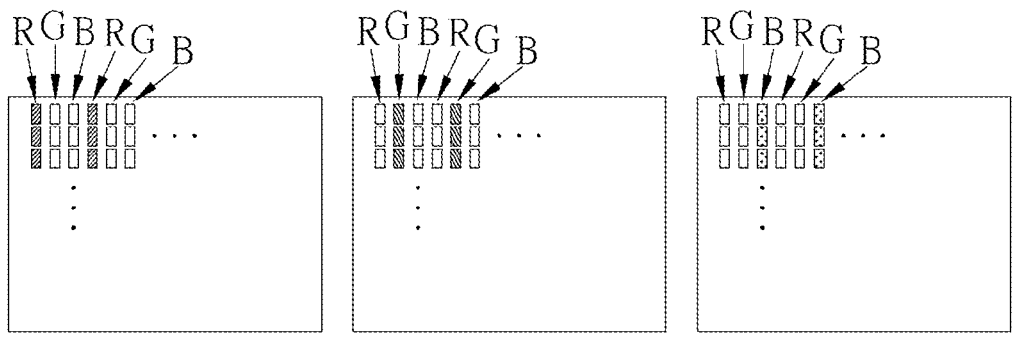
FIG. 24 shows a test pattern of a solely R or G or B full-screen.

Thus, the basic test patterns illustrated in FIG. 24~FIG. 26 can be used to construct the relationship between the sub-pixel position of the projection unit and the ideal positions of the sub-pixels, and to, in corporation of the viewing zone modulating screen, re-arrange the sub-pixels whose positions are closest to the ideal projection positions to construct (i.e. re-define) a pixel for image display. Examples of applicable basic test patterns include various patterns capable of solely displaying the R or G or B sub-pixels, such as a solely R or G or B full-screen, and a solely R or G or B horizontal line, vertical line, or grating pattern, and other applicable patterns, wherein the disclosure does not impose any restriction regarding the patterns. The image arrangement method (for re-arranging and re-grouping the RGB sub-pixels) of the present embodiment largely reduces the likelihood of crosstalk occurring to the 3D image and enhances the image quality of the 3D image.

Figure 27A:
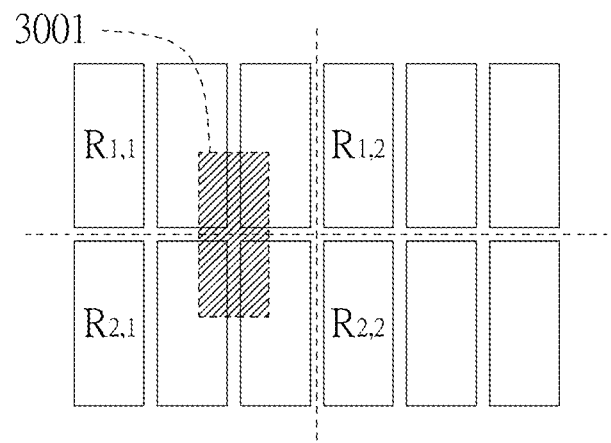
FIG. 27A~FIG. 27C show the synthesis and modulation of a middle point sub-pixel according to an embodiment of the disclosure.
Figure 27B:
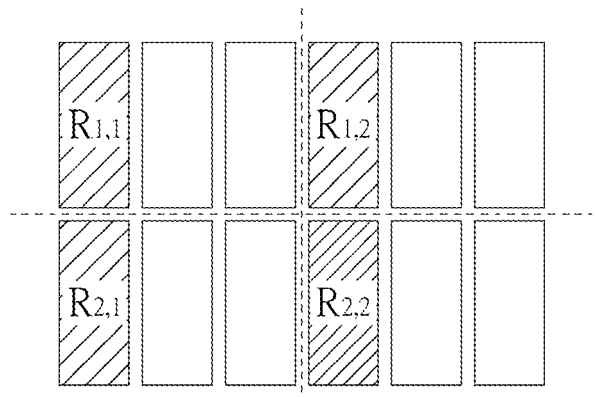
Figure 27C:
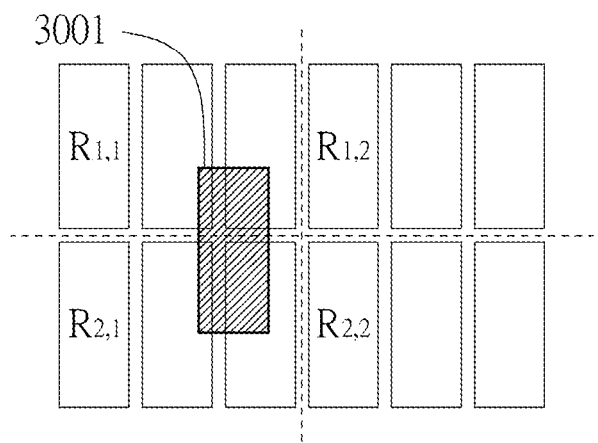

Besides, a middle point sub-pixel can be synthesized at a requested position by modulating a plurality of sub-pixels. Referring to FIG. 27A~FIG. 27C, the synthesis and modulation of a middle point sub-pixel according to an embodiment of the disclosure are shown. As indicated in FIG. 27A, if a R sub-pixel needs to be formed at the position 3001 for visual needs, the brightness of four neighboring R sub-pixels R1,1, R1,2, R2,1, R2,2 are modulated respectively as indicated in FIG. 27B. The brightness of the sub-pixels R1,1, R1,2 and R2,1 is modulated as 20% and the brightness of the sub-pixel R2,2 is modulated as 30%, so as to generate the visual effect of forming an R sub-pixel at the position 3001 as indicated in FIG. 27C.

The multi-viewing zone miniaturized imaging module and the multi-viewing zone 3D display system using disclosed in the above embodiment of the disclosure have many advantages exemplified below:

(1) In an embodiment, each multi-viewing zone miniaturized imaging module is an independent device, and the single system implemented by a single miniaturized imaging module is small in size.

(2) When the projection unit 201 of a single miniaturized imaging module of the embodiment projects a to-be-displayed multi-viewing zone image onto the viewing zone modulating screen 209, the projection multi-viewing zone image after having been refracted by the transparent structure frame 203 still completely reaches the front edge 2032 of the transparent structure frame 203. In comparison to the conventional 3D display system, the stereoscopic sense of the image of the 3D display system according to an embodiment of the disclosure is not affected by the frame no matter how the images are stacked or spliced, and neither the stereoscopic sense nor the representation of depth of the 3D image generated by the 3D display system according to an embodiment of the disclosure will be damaged or restricted.

(3) When the multi-viewing zone miniaturized imaging module of the embodiment being an independent device forming a 3D display system, individual adjustment can be applied to a single miniaturized imaging module so the adjustment is made relatively easier.

(4) By modifying or changing the brace structure of each miniaturized imaging module, the miniaturized imaging module of the embodiment can splice a flat or cambered display screen (as indicated in FIG. 14A~FIG. 14C), so the miniaturized imaging module of the embodiment is very flexible in application and system splicing.

(5) When the multi-viewing zone miniaturized imaging modules of the embodiment each being an independent device are spliced to form a 3D display system, there is no image overlapped region which occurs to the conventional 3D display system, so there is no need to perform any particular processing on neighboring images, and the stereoscopic sense and representation of depth of a 3D image will not be damaged or deteriorated. The conventional structure is incapable of eliminating the seam of the overlapped regions, so the 3D image is segmented at boundary seams.

(6) In comparison to the conventional miniaturized imaging module incapable of eliminating the optical distortion which results in severe crosstalk, the multi-viewing zone miniaturized imaging module of the embodiment is free of overlapped region and re-arranges the sub-pixels, hence largely reducing the crosstalk of system display and enhancing the display quality of 3D image.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A 3D display system, comprising:
   a plurality of multi-viewing zone miniaturized imaging modules, each multi-viewing zone miniaturized imaging module comprising:
   a housing;
   a projection unit disposed on an inner side of the housing; and
   a viewing zone modulating screen disposed on another inner side of the housing and opposite to the projection unit which projects an image onto the viewing zone modulating screen, and the viewing zone modulating screen comprising;
   a fixing structure disposed on the housing for fixing and modulating a relative position and a relative angle between the projection unit and the viewing zone modulating screen;
   a viewing zone modulating layer disposed in front of the fixing structure for correspondingly projecting multi-viewing zone images in a predetermined direction respectively; and
   a light diffusion layer disposed between the fixing structure and the viewing zone modulating layer, wherein an image projected from the projection unit passes through the light diffusion layer and enters the viewing zone modulating layer,
   wherein a plurality of viewing zones formed by the multi-viewing zone images are positioned in front of the viewing zone modulating layer, while the projection unit is positioned in rear of the light diffusion layer;
   wherein, in each multi-viewing zone miniaturized imaging module, the projection unit projects the multi-viewing zone images onto respective viewing zone modulating screen and forms the viewing zones in front of the viewing zone modulating screen, and the image is a segmented image composed of a plurality of images having different view-angles; and
   an image output module for editing, adjusting and distributing the multi-viewing zone images to the multi-viewing zone miniaturized imaging modules for display.

2. The 3D display system according to claim 1, wherein in each miniaturized imaging module, the viewing zone modulating screen distributes the multi-viewing zone images projected by the projection unit to a plurality of different regions in the space, and a 3D display image is composed of two images belonging to different viewing zones in the space.

3. The 3D display system according to claim 1, wherein the image output module can perform insertion, construction, segmentation, and brightness and color adjustment to a multi-view static or dynamic image either in real time or not in real time, and further distribute the edited and adjusted static or dynamic multi-view image to the miniaturized imaging modules for display.

4. The 3D display system according to claim 1, wherein in the segmented images formed by the viewing zone modulating screens, every two adjacent segmented images are tightly jointed.

5. The 3D display system according to claim 1, wherein the miniaturized imaging modules are arranged in an array.

6. The 3D display system according to claim 5, wherein the miniaturized imaging modules are arranged as a one-dimensional array.

7. The 3D display system according to claim 5, wherein the miniaturized imaging modules are stacked and arranged as a two-dimensional array.

8. The 3D display system according to claim 1, wherein the display screen composed of the viewing zone modulating screens has a curved surface.

9. The 3D display system according to claim 1, wherein the display screen composed of the viewing zone modulating screens has a flat surface.

10. The 3D display system according to claim 1, wherein a plurality of viewing zones formed by each miniaturized imaging module tilts towards the middle direction, that is, a plurality of viewing zones formed by the miniaturized imaging module relatively located in the left-hand side of the display screen tilts to the right, and a plurality of viewing zones formed by the miniaturized imaging module relatively located in the right-hand side of the display screen tilts to the left.

11. The 3D display system according to claim 1, wherein a plurality of viewing zones formed by each miniaturized imaging module is directed towards the same direction.

12. The 3D display system according to claim 1, further comprising a power distribution device electrically connected to the multi-viewing zone miniaturized imaging modules for distributing and providing the power needed by the multi-viewing zone miniaturized imaging modules.

13. A miniaturized imaging module, comprising:
   a housing;
   a projection unit disposed on an inner side of the housing; and
   a viewing zone modulating screen disposed on another inner side of the housing and opposite to the projection unit, the viewing zone modulating screen comprising:
   a fixing structure disposed on the housing for fixing and modulating a relative position and a relative angle between the projection unit and the viewing zone modulating screen;
   a viewing zone modulating layer disposed in front of the fixing structure for correspondingly projecting multi-viewing zone images in a predetermined direction respectively; and
   a light diffusion layer disposed between the fixing structure and the viewing zone modulating layer, wherein an image projected from the projection unit passes through the light diffusion layer and enters the viewing zone modulating layer,
   wherein a plurality of viewing zones formed by the multi-viewing zone images are positioned in front of the viewing zone modulating layer, while the projection unit is positioned in rear of the light diffusion layer;
   wherein a correspondence relationship between the projection unit and the viewing zone modulating screen can be modulated, the projection unit projects a plurality of to-be-displayed multi-viewing zone images onto the viewing zone modulating screen, which further distributes the projection multi-viewing zone images to different regions in the space, and a 3D display image is composed of two multi-viewing zone images belonging to different viewing zones in the space.

14. The miniaturized imaging module according to claim 13, wherein the fixing structure of the viewing zone modulating screen comprises:
- a transparent structure frame, wherein the projection unit projects the to-be-displayed multi-viewing zone image onto the viewing zone modulating screen, and the projection multi-viewing zone image is refracted by the transparent structure frame and completely reaches a front edge of the transparent structure frame.

15. The miniaturized imaging module according to claim 14, wherein the transparent structure frame has a thickness, the fixing structure further comprises a locking element for fixing the transparent structure frame on the housing, and an image optical path of the projection multi-viewing zone image averts the locking element and completely reaches the front edge of the transparent structure frame.

16. The miniaturized imaging module according to claim 14, wherein the light diffusion layer is disposed at the front edge of the transparent structure frame.

17. The miniaturized imaging module according to claim 13, wherein the viewing zone modulating layer comprises a plurality of lenticular lenses which are arranged in parallel to form a lens array, the lenticular lenses have a screen tilted angle with respect to a vertical reference direction, each lenticular lens has a curved surface and a flat surface or two curved surfaces, and a focal plane of the lenticular lenses is connected to the light diffusion layer.

18. The miniaturized imaging module according to claim 17, wherein at least one of an image rotation angle and the screen tilted angle is equal to 0 degree.

19. The miniaturized imaging module according to claim 17, wherein an image rotation angle and the screen tilted angle are both larger than 0 degree.

20. The miniaturized imaging module according to claim 17, wherein the light diffusion layer is disposed on the focal plane of the lenticular lenses and located between the fixing structure and the viewing zone modulating layer.

21. The miniaturized imaging module according to claim 13, wherein the viewing zone modulating layer further comprises:
- a transparent layer; and
- a barrier layer located on the transparent layer to form a plurality of strip regions arranged in parallel and separated by a distance, wherein the strip regions have a screen tilted angle with respect to a vertical reference direction.

22. The miniaturized imaging module according to claim 21, wherein at least one of an image rotation angle and the screen tilted angle is equal to 0 degree.

23. The miniaturized imaging module according to claim 21, wherein an image rotation angle and the screen tilted angle are both larger than 0 degree.

24. The miniaturized imaging module according to claim 21, wherein the light diffusion layer is disposed on the transparent layer.

25. The miniaturized imaging module according to claim 21, wherein each miniaturized imaging module comprises a pixel array, which generates the required segmented image in response to the viewing zones and the screen tilted angle of the strip regions.

* * * * *